Figure 1:
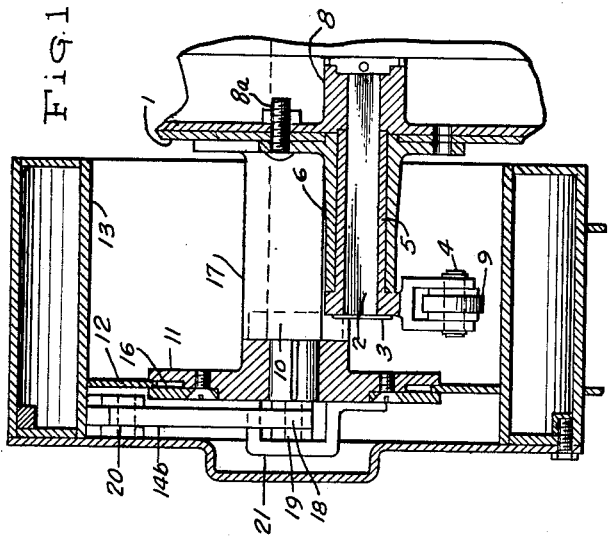

Dec. 15, 1964

T. B. EDWARDS 3,161,248

VEHICLE WHEEL SUSPENSION

Filed June 8, 1962

3 Sheets-Sheet 1

INVENTOR.
THEODORIC B. EDWARDS

BY
George F. Westerman
ATTORNEY

Dec. 15, 1964 T. B. EDWARDS 3,161,248
VEHICLE WHEEL SUSPENSION
Filed June 8, 1962 3 Sheets-Sheet 2
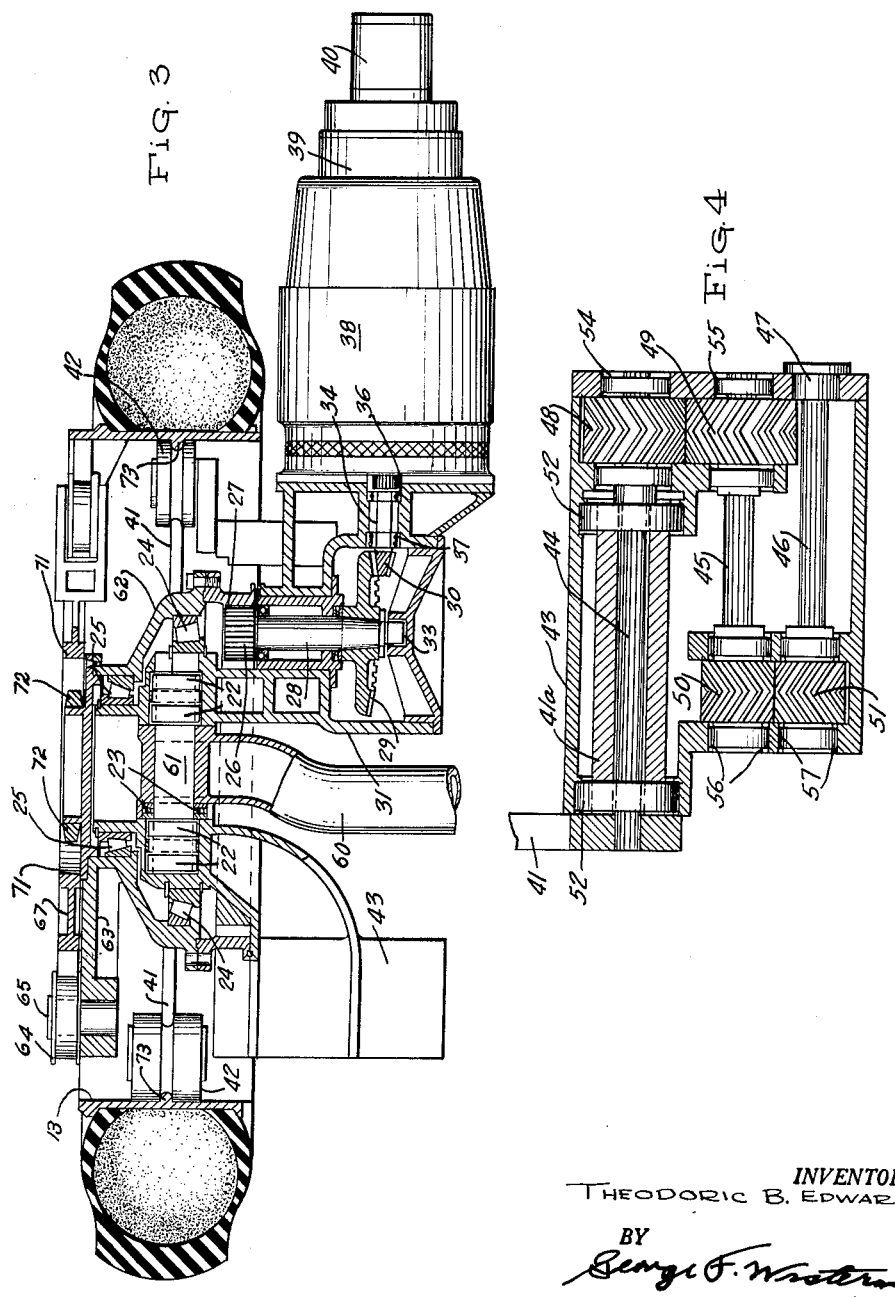
INVENTOR.
THEODORIC B. EDWARDS
BY
George F. Westerman
ATTORNEY

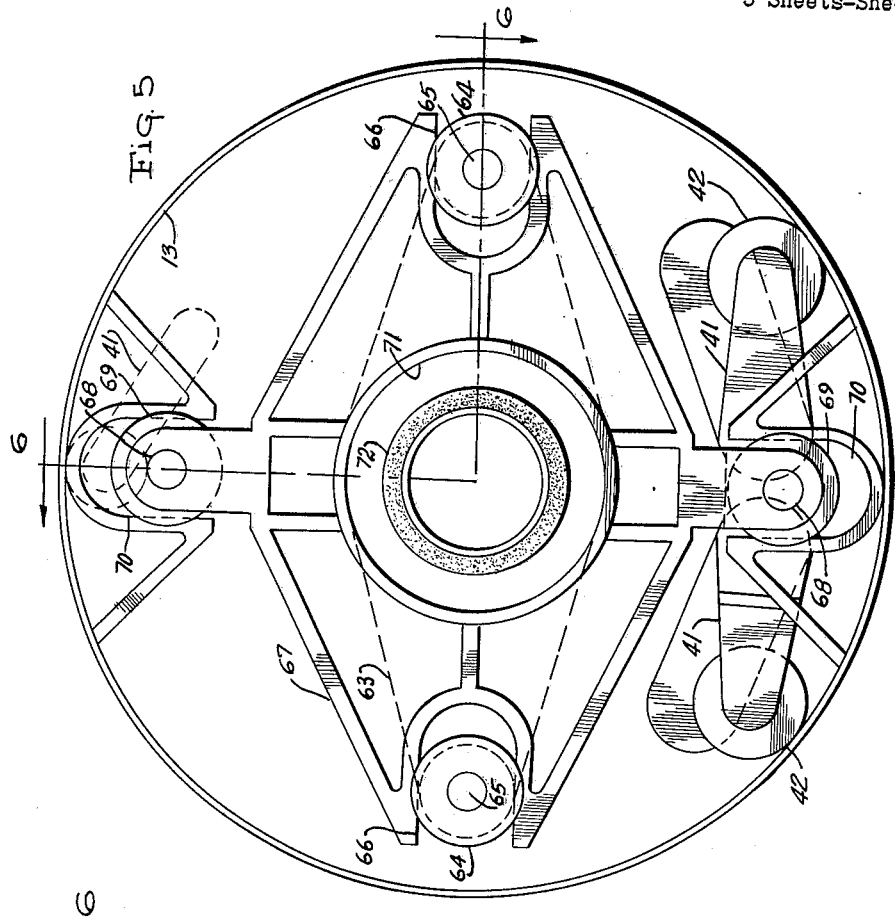

# United States Patent Office 3,161,248
Patented Dec. 15, 1964

3,161,248
VEHICLE WHEEL SUSPENSION
Theodoric B. Edwards, Alexandria, Va., assignor to the United States of America as represented by the Secretary of the Army
Filed June 8, 1962, Ser. No. 201,216
5 Claims. (Cl. 180—10)
(Granted under Title 35, U.S. Code (1952), sec. 266)

The invention described herein may be manufactured and used by or for the Government for governmental purposes without the payment to me of any royalty thereon.

The present invention relates to improvements in land vehicle propulsion, in amphibious vehicle propulsion, and in support wheels. More particularly, this invention relates to vehicle wheels which have torsion suppport means supporting the wheel rim from within, and a coupling to transmit torque from the hub to the rim. These systems are adapted to utilization with individual driving electric motors mounted within the hub.

In Patent No. 2,926,047, issued February 23, 1960, to the instant inventor, a vehicle wheel assembly embodying certain characteristics of the instant invention, was described. This patented invention included individual wheel spring torsion cushion means as well as a coupling to transmit torque from the hub to the rim; however, the spring torsion cushion means of that invention coacted between the hub and the rim of the wheel. While the arrangement of the aforesaid patented invention is satisfactory for large multispring wheels, for smaller wheels, it is unsatisfactory in that a variance in the spring constant of the spokes, with the rotative position of the wheel, causes a vibratory force to act on the body of the vehicle. This vibratory force is, of course, objectionable when the vehicle is traveling at high speeds.

Accordingly, it is an object of the present invention to provide an improvement in the wheel vehicle assembly described in Patent No. 2,926,047, whereby, the motor may be mounted in fixed relation to the chassis, either internally or externally of the body without subjecting the motor and shaft to the jolts and shocks received by the wheel, and without excessive vibrations.

A further object of this invention is to provide, in a vehicle wheel suspension system with the motor mounted on or in fixed relation to the axle of the wheel, torsioned suspension and support means for the rim of said wheel, acting between the chassis of the vehicle and the rim of the wheel, in the case of nonsteering wheels, and between a member in horizontal fixed relation to the axle, and the rim of the wheel, in the case of wheels equipped for steering.

Still another object of the present invention is to provide improvements in torque linkages between the hub and the rim of the wheel which will not interfere with relative radial motion between the hub and the rim, thereby allowing complete and efficient operation of a torsion suspension system, which linkages nevertheless will at all times positively transmit torque from the hub to the rim.

Briefly, the invention comprises torsion suspension means, mounted on the chassis or on a frame which is in fixed radial relation to the hub, including torsion rollers exerting pressure outwardly against the inner surface of the rim; and torque transmission means between the hub of the wheel and the rim which operates independently of the suspension system and regardless of the relative radial position of the hub and the rim.

Figure 7:
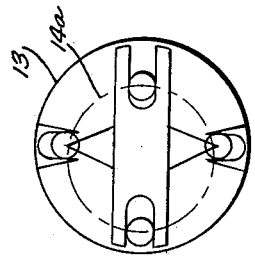
Figure 8:
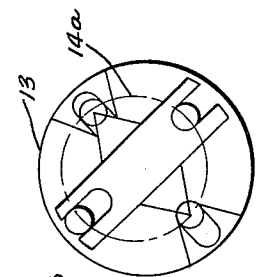
Figure 2:
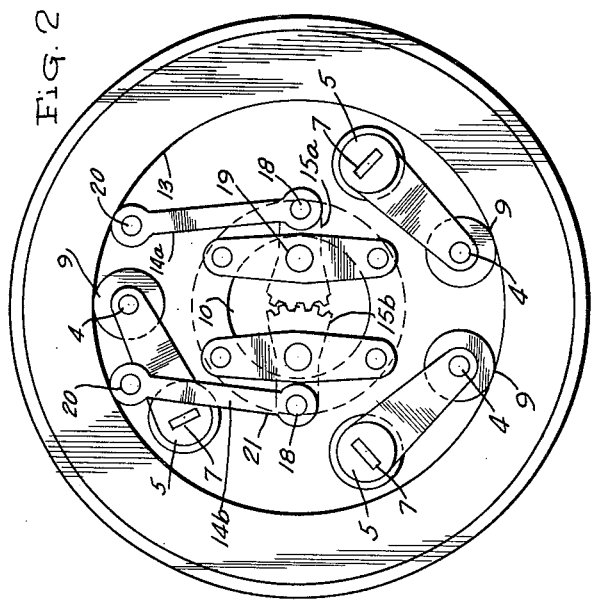
Figure 9:
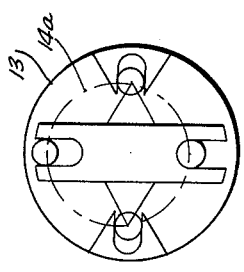

Additional objects and advantages will be apparent to those skilled in the art from the following detailed descriptions of the preferred embodiments and drawings thereof, wherein:

FIG. 1 is a vertical section of a nonsteering embodiment;
FIG. 2 is a vertical end section of the assembly of FIG. 1, partially broken away to show features of construction;
FIG. 3 is a vertical section of a wheel equipped for steering;
FIG. 4 is a detailed vertical section of the torsion bar assembly utilized in FIG. 3;
FIG. 5 is an end vertical section of a portion of the assembly shown at FIG. 3, partially broken away to show features of construction;
FIG. 6 is a sectional view along line 6—6 of FIG. 5; and
FIGS. 7, 8, and 9, diagrammatically illustrate various positions of the torque transmitting linkage system imparting rotation to a vehicle wheel rim.

FIGS. 1 and 2 show an embodiment of this invention adapted for wheels of a nonsteering or track type vehicle. Power is imparted to the drive assembly through drive shaft 10, in housing 17, by an electric motor or other source connected thereto and located within chassis 1. At the end of drive shaft 10 is drive linkage assembly 21, comprising geared links 15a and 15b connected to the base thereof by link pins 19. Geared links 15a and 15b are connected at their outer ends to straight links 14a and 14b by link pins 18. Straight links 14a and 14b are connected to the inner surface of wheel rim 13 by rim linkage 20. The operation of geared links 15a and 15b and straight links 14a and 14b to transmit torque to wheel rim 13 is explained in Patent No. 2,926,047 referred to above, which embodies this structure for torque linkage. The structure permits transmission of torque to the rim while allowing a change in the relative position of the shaft and the rim. When torque is applied to the shaft in a clockwise direction as shown in FIG. 2, gear link 15a would tend to move downward and thereby apply tension to straight link 14a. The tension in straight link 14a would be transmitted by gear link 15a through the meshing gear segments to gear link 15b to force the straight link 14b upward. Link 14a would then be under tension while at the same time straight link 14b would be under compression so as to cause straight link 14a to be pulling the rim in a clockwise direction while straight link 14b would be pushing the rim in the same direction. This force is transmitted in the same manner even when shaft 10 and the drive linkage assembly 21 are displaced radially with respect to the axial center of rim 13.

The longitudinal position of the rim 13 with respect to the hub 11 is maintained by the interrelationship of flange 12 on rim 13 and the channeled extremity of hub 11, which provides for clearance 16, allowing radial displacement of the hub with respect to the axial center of rim 13. The hub 11 is affixed to the chassis 1 by a plurality of securing means, such as bolt 8a through trunnion 6 on the outside of chassis 1 and torsion bar anchor 8 on the inside of chassis 1.

Torsion support for the wheels are provided, in this embodiment, by three torsion bars with rollers connected thereto by crank arms exerting their force on the interior of the rim. Torsion bars 2 are secured at torsion bar anchor 8 in a rectangular slot in anchor 8 like the rectangular slot 7 shown in FIG. 2 for securing the movable end of torsion bar 2. Other means for securing the torsion bars to the anchors include the well known shrink fittings, key spline, pin or any such fastening. They extend outwardly from anchor 8 through crank spindle 5 and rigidly connected at their extremities to crank arm 3 by use of torsion bar slot 7. Rollers 9 are connected to crank arm 3 by roller pins 4. Trunnions 6 and spindle 5 hold` roller pins 4 in alignment. As shown in FIG. 2, three torsion bars are utilized in this embodiment. However, a minimum of only two torsion bars with rollers are required for a land vehicle wheel. The upper torsion roller has a function only of providing stability and may be eliminated depending upon the use of the wheel. In most cases the elimination of the upper torsion roller would require more spacing between the lower torsion rollers.

FIGS. 3 and 4 depict in detail the same suspension concept applied to a wheeled vehicle where steering of the wheel is desirable. Member 31 is pivotally connected to axle 60 by means of king pin 61 with bearings 23 and 22. Mounted on member 31 is motor 38, parking brake 39, and blower assembly 40, details of which are not shown herein. Power is transmitted from the motor through shaft 34 within bearings 36 and 37, through beveled pinion 30, through bevel gear 29 to shaft 28. Shaft 28 rests in bearing 33 and turns gear 26, which, through pinion gear 27, turns hub 62. Torque is transmitted from the hub to the rim 13 through driving crank 63, see also FIG. 5, to rollers 64 rotatably mounted by pins 65 on driving crank 63. Guides 66, sliding on rollers 64 transmit torque through sliding yoke 67, clevis 19, and pins 68 to rollers 69, and thence to rim 13 through guides 70. It will be noted that this method of transmission of torque from the hub to the rim allows for relative radial motion between the hub and rim without interfering with the transmission of torque. On the inner circumference of sliding yoke 67 is buffer ring 71, which, will, during such radial motion of the rim, approach and even contact rubber buffer 72 which is mounted in fixed relation to the hub 62, and which is intended to absorb shocks over and above those taken out of the system by the torsion bars described below. Hub 62 turns about member 31 on tapered roller bearings 25 and 24.

Mounted to and in fixed relation with member 31 are torsion bar suspension units within spring cases 43 each of which units comprises a plurality of segmented interlocking torsion bars. As this embodiment utilizes three such torsion bar units, there are three spring cases 43 in the system. External of spring case 43, details of which follow, is crank arm 41 and rotatably mounting grooved rollers 42. Rollers 42 turn along the inner circumference of rim 13 on flange 73. In this embodiment as well as the embodiment described in FIG. 1, three such torsion rollers are utilized, the upper torsion roller being for stabilization purposes and may possibly be eliminated in a land vehicle wheel. Torsion crank arms 41 may extend inwardly or outwardly to rollers 42 as shown in FIGS. 3 and 5, respectively.

Within spring case 43, as shown in FIG. 4, are three torsion bar segments 44, 45, and 46. A crank arm sleeve 41a is rigidly affixed to crank arm 41. Segment 44 is within the crank arm sleeve 41a. It is supported by roller bearings 52 and 54. Double helical gear 48 is fixed to the extremity of torsion bar segment 44 in such a way as to intermesh with double helical gear 49 affixed to torsion bar segment 45 which, in turn, is supported by roller bearings 55 and 56. At the other end of torsion bar segment 45 is gear 50, which meshes with gear sector 51 affixed to one end of torsion bar segment 46 supported by roller bearings 57. At the other end of torsion bar segment 46 is anchor 47 by which the torsion bar segment 46 is affixed to the spring case 43, king pin 61 and chassis 1. Torsion bar segments are utilized to provide a compact unit which will not interfere with the pivoted steering of the wheel. Where steering of the wheel is not necessary, a single long bar may be used in lieu of this segment assembly.

FIGURES 7, 8, and 9 are schematic drawings showing how torsion is applied to the rim 13 notwithstanding a change in relative radial position between the hub (center of which is determined by the center of circle 14a) and the rim 13.

I claim:

1. A vehicle wheel assembly comprising a hub, a torque source, a vehicle chassis, said hub rotatably mounted in substantially fixed relation to said torque source and to the vehicle chassis; first torque transmission means between said torque source and said hub; a cylindrical rim generally surrounding said hub; second torque transmission means between said hub and said rim; torsion suspension means including a plurality of torsion bars anchored on one end on said vehicle chassis and affixed to said chassis at a location different from the location of mounting said torque transmission means and said hub, torsion crank arms affixed on one end to the unanchored end of each of said torsion bars, and rollers rotatably mounted on the free ends of each of said torsion crank arms and so disposed as to roll along the inner surface of said rim and to exert forces tending to maintain said rim in a position concentric with said hub.

2. A vehicle wheel assembly comprising a hub, a torque source, a vehicle chassis, said hub rotatably mounted in substantially fixed relation to said torque source and said vehicle chassis; torque transmission means between said torque source and said hub; a cylindrical rim generally surrounding said hub; torque transmission means between said hub and said rim including a pair of oppositely extending lever arms pivotally mounted on said hub and having intermeshing gear segments at the adjacent ends, each of said lever arms being pivotally connected at the extending ends thereof to a linkage member which is pivotally connected to said rim; and torsion suspension means including a plurality of torsion bars anchored on one end on said vehicle chassis and affixed to said chassis at a location different from the location of mounting said torque transmission means and said hub, torsion crank arms affixed on one end to the unanchored end of each of said torsion bars, and rollers rotatably mounted on the free ends of each of said torsion crank arms and so disposed as to roll along the inner surface of said rim and to exert forces tending to maintain said rim in a position concentric with said hub.

3. A vehicle wheel assembly comprising a hub, a torque source, a vehicle chassis, said hub rotatably mounted in substantially fixed radial relation to said torque source and to said vehicle chassis; torque transmission means between said torque source and said hub; a cylindrical rim generally surrounding said hub; torque transmission means between said hub and said rim including a driving crank mounted on said hub, a plurality of driving rollers rotatably mounted on said driving crank, a sliding yoke engaging each of said driving rollers with guides radially slidable in respect to said hub, a plurality of driven rollers rotatably mounted on said sliding yoke, a plurality of guides radially slidable with respect to said hub mounted on the inner surface of said rim, each of said guides engaging a driven roller, and buffer means between said sliding yoke and said hub; and torsion suspension means including a plurality of torsion bars anchored on one end and affixed to said chassis at a location different from the location of mounting said torque transmission means and said hub, torsion crank arms affixed on one end to the unanchored end of each of said torsion bars, and rollers rotatably mounted on the free ends of each of said torsion crank arms and so disposed as to roll along the inner surface of said rim and to exert forces tending to maintain said rim in a position concentric with said hub.

4. The vehicle wheel assembly of claim 3 wherein each of said torsion bars comprises a plurality of torsion bar segments interconnected by gears.

5. A vehicle wheel assembly comprising a frame pivotally mounted on a vehicle axle; a hub rotatably mounted in substantially fixed radial relation to said frame; a motor mounted on said frame; first torque transmission means between said motor and said hub; a cylindrical rim generally surrounding said hub; second torque transmission means between said hub and said rim including a driving crank mounted on said hub, a plurality of driving rollers rotatably mounted on said driving crank, a sliding yoke engaging each of said driving rollers with guides radially slidable with respect to said hub, a plurality of driven rollers rotatably mounted on said sliding yoke, a plurality of guides radially slidable in respect to said hub and mounted on the inner surface of said rim, each of said guides engaging a driven roller, and buffer means between said sliding yoke and said hub; and torsion suspension means including a plurality of torsion units affixed to said frame at a location different from the location of mounting said torque transmission means and said hub, torsion crank arms affixed on one end to the free end of each of said torsion units, and rollers rotatably mounted on the free ends of each of said torsion crank arms and so disposed as to roll along the inner surface of said rim and to exert forces tending to maintain said rim in a position concentric with said hub, each of said torsion units comprising a plurality of connected torsion bar segments gear connected in series and one end of the torsion series anchored to said torsion unit.

References Cited by the Examiner
UNITED STATES PATENTS

| | | | |
|---|---|---|---|
| 1,387,777 | 8/21 | Henry | 152—62 |
| 1,632,804 | 6/27 | Shoup | 180—10 X |
| 1,916,391 | 7/33 | Shamberger | 64—22 |
| 2,926,047 | 2/60 | Edwards | 305—34 |

A. HARRY LEVY, *Primary Examiner.*

LEO FRIAGLIA, *Examiner.*